Nov. 30, 1965 R. M. REPKA 3,220,489
CULTIVATOR SWEEP ASSEMBLY
Filed Nov. 19, 1963
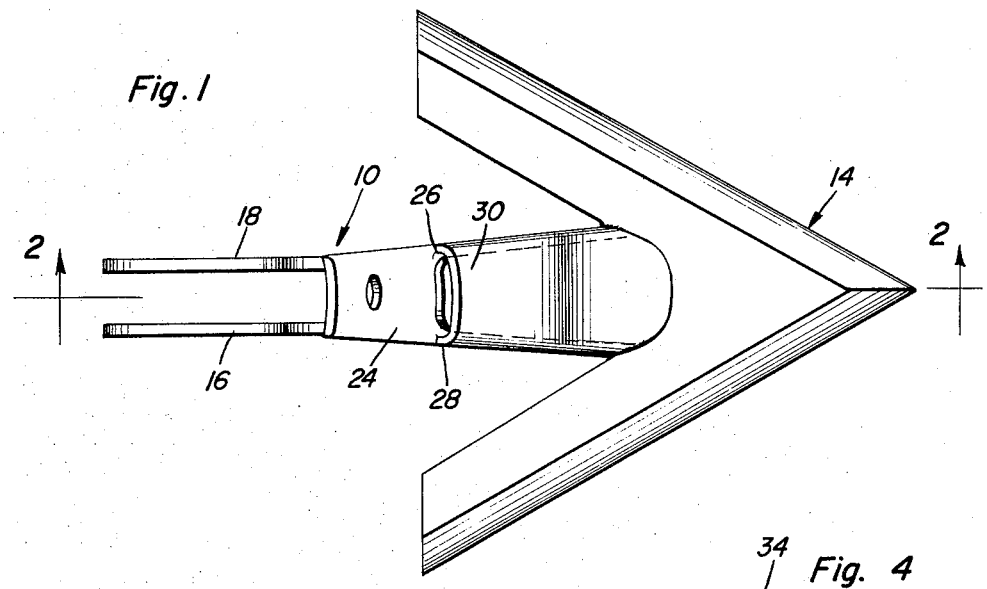
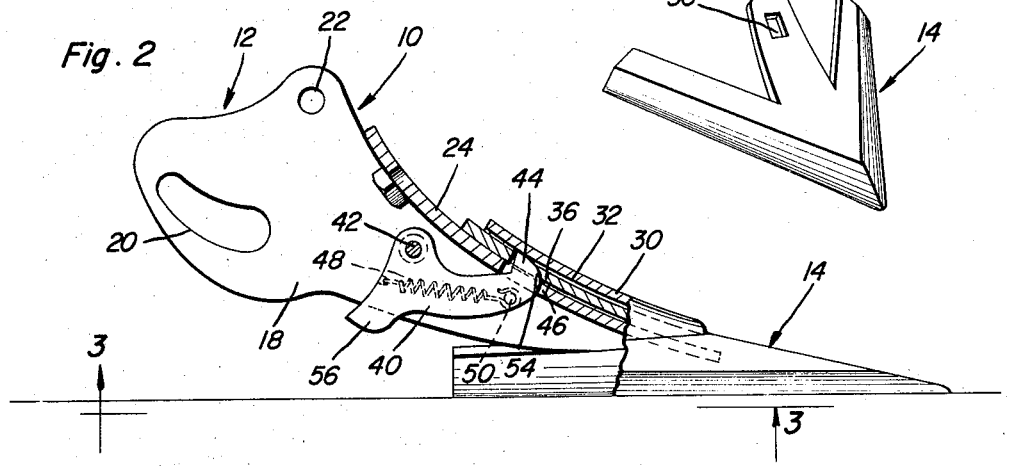
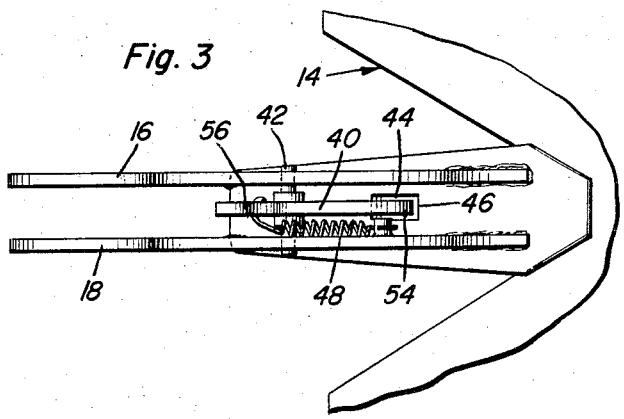
Robert M. Repka
INVENTOR.

3,220,489
CULTIVATOR SWEEP ASSEMBLY
Robert M. Repka, Three Rivers, Tex.
(1103 S. Jefferson St., Kaufman, Tex.)
Filed Nov. 19, 1963, Ser. No. 324,641
2 Claims. (Cl. 172—750)

This invention relates to a novel and useful cultivator sweep assembly and more specifically to an assembly adapted to be supported from a farm implement and including an elongated depending cultivator shank and a sweep tongue. The depending cultivator shank includes a pair of depending elongated side walls interconnected by means of a forward depending web and the elongated tongue of the sweep is removably and telescopically received in a downwardly opening channel defined by the cultivator shank. The downwardly opening channel is curved forwardly at its lower end and the elongated tongue of the sweep is similarly curved so as to be snugly received in the channel.

The downwardly opening channel is secured to the cultivator shank along the lower edges of its side walls whereby the channel defines an elongated pocket in which to receive the elongated tongue of the sweep.

Inasmuch as the curvature of the tongue of the sweep matches the curvature of the downwardly opening pocket in which the tongue is snugly received, an extremely strong connection between the sweep and the cultivator shank is provided by the telescopic engagement of the tongue within the pocket.

Coacting releasable latch means carried by the shank of the sweep assembly and the tongue of the sweep provides means for releasably securing the sweep to the shank with the tongue of the sweep snugly received in the pocket defined by the shank.

The main object of this invention is to provide a cultivator sweep assembly including means by which a sweep may be removably secured to a depending shank of the assembly in a manner whereby the sweep may be readily replaced when desired.

A further object of this invention is to provide a cultivator-sweep assembly including a removable sweep and a sweep which is secured to the shank portion of the assembly in a manner whereby an extremely rigid connection between the sweep and the shank portion is formed.

Another object of this invention is to provide a longitudinally tapered pocket for telescopingly receiving the tongue of the sweep and to provide a longitudinally tapering tongue on the sweep for telescopic and seating engagement with the portions of said shank defining said pocket.

Still another object of this invention is to provide a cultivator sweep assembly including releasable latch means for retaining the tongue of the sweep assembly in telescopic engagement with an elongated pocket defined by the shank portion of the sweep assembly with the releasable latch means completely enclosed whereby efficient operation of the releasable latch mechanism will not be effected by usage of the cultivator sweep assembly and contact of the latter with the ground that is being worked.

A final object of this invention, in accordance with the preceding object, is to provide a cultivator sweep assembly which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the cultivator sweep assembly of the instant invention;

FIGURE 2 is a longitudinal vertical sectional view taken substantially upon a plane indicated by section line 2—2 of FIGURE 1;

FIGURE 3 is a fragmentary bottom plan view of the cultivator assembly taken substantially upon the plane indicated by section line 3—3 of FIGURE 2; and FIGURE 4 is a perspective view of the sweep portion of the assembly.

Referring now more specifically to the drawings the numeral 10 generally designates the cultivator sweep assembly of the instant invention. The assembly 10 comprises a shank portion generally referred to by the reference numeral 12 and a cultivator sweep portion generally referred to by the reference numeral 14.

The shank portion 12 includes a pair of elongated depending side walls 16 and 18 which are each slotted at 20 and apertured at 22 for pivotal connection to a depending standard section (not shown) of a farm implement.

The legs 16 and 18 are interconnected at their forward ends by means of an upstanding elongated web or front wall 24 and a rearwardly and downwardly opening channel including a pair of converging legs 26 and 28 interconnected by means of a bight portion or false front wall 30 is secured to and overlies the lower portion of the web 24.

As can best be seen from FIGURE 2 of the drawings the web 24 and the bight portion 30 are slightly longitudinally curved. The web 24 and bight portion 30 each curve forwardly at their lower ends and an elongated downwardly opening and longitudinally tapering pocket 32 is defined between confronting surfaces of the web 24, the legs 26 and 28 and the bight portion 30.

The sweep 14 includes an elongated and longitudinally curved and tapered tongue 34 which is apertured as at 36 and it will be noted that the tongue 34 has a curvature corresponding to the curvatures of the web 24 and bight portion 30 and a taper corresponding to the taper of the pocket 32. Accordingly, it may be seen that the tongue 34 may be snugly and telescopically received within the downwardly opening pocket 32 so as to fixedly support the sweep 14 from the shank portion 12.

A pivoted latch member 40 is pivotally supported between the side walls 18 and 20 by means of pivot pin 42 and includes a locking dog 44 which is receivable through the aperture 36 and a corresponding aperture 46 formed in the web 24. An expansion spring 48 is provided and is connected between the latch member 40 and an anchor pin 50 and yieldingly urges the locking dog 44 into the locking position illustrated in FIGURE 2 of the drawings with the locking dog 44 projecting through the apertures 36 and 46.

It will be noted that the locking dog 44 includes an inclined surface 54 which is engageable by the free end of the tongue 34 upon movement of the latter upwardly through the pocket 32 and operable, upon engagement by the tongue 34, to cam the locking dog 44 downwardly through the aperture 46 until such time as the aperture 36 is aligned with the aperture 46. At this point, the expansion spring 48 will swing the latch member 40 into the position illustrated in FIGURE 2 of the drawings to releasably lock the tongue 34 of the sweep 14 within the pocket 32.

The taper of the tongue 34 and the curvature of the latter and the pocket 32 serve to provide a means whereby the sweep 14 may be fixedly supported from the shank portion 12 in a manner affording very little relative movement between the sweep 14 and the shank portion 12.

However, it may be seen that the latch member 40 includes a portion 56 which projects slightly below the adjacent portions of the side walls 16 and 18 and is adapted to be engaged by the hand of a workman so that the latch member 40 may be pivoted to the inoperative position in order that the sweep 14 may be removed from operative engagement with the shank portion 12. Accordingly, it may be seen that herein described is a cultivator sweep assembly which will carry out the objects of the invention hereinbefore set forth and may be readily manufactured so as to be adaptable for use on various types of existing farm equipment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cultivator sweep assembly comprising an elongated depending cultivator shank including forwardly and downwardly inclined elongated side walls interconnected by means of a forwardly and downwardly inclined web defining a front wall, said front wall being longitudinally curved so as to curve forwardly at its lower end, a sweep including an elongated forwardly and downwardly inclined tongue, a rearwardly and downwardly opening channel secured to said front wall including depending sides interconnected by a forward and downwardly inclined and longitudinally curved imperforate bight portion defining a false front wall, the free edges of said sides being secured to the opposite longitudinal marginal edge portion of said web with said bight portion overlying said front wall in spaced relation thereto, said bight portion having a longitudinal curvature corresponding to the curvature of said front wall, said channel and said front wall defining a curved elongated pocket enclosed thereby and open at its lower forward end, said tongue being longitudinally curved and removably and telescopingly received in said pocket with said tongue snugly received between said front wall and said false front wall and between said depending sides, said tongue being tapered in width toward the free end thereof and said pocket being correspondingly tapered toward its upper end, coacting latch means carried by said shank and tongue beneath said false front wall releasably locking said tongue in said pocket, said coacting latch means comprising a latch member pivotally supported between said side walls for oscillation about an axis extending between said side walls, said tongue and web having aligned openings formed therethrough, and said latch member including one end portion removably passed through said opening.

2. The combination of claim 1 including means yieldingly urging said latch member toward a position with said end portion passed through said openings.

References Cited by the Examiner
UNITED STATES PATENTS

| | | | |
|---|---|---|---|
| 1,250,472 | 12/1917 | Kirkpatrick et al. | 172—750 X |
| 3,061,021 | 10/1962 | Shader | 172—750 |
| 3,120,873 | 2/1964 | Bledsoe | 172—762 X |

FOREIGN PATENTS 106,027  12/1938  Australia.

ANTONIO F. GUIDA, *Acting Primary Examiner.*

T. GRAHAM CRAVER, *Examiner.*